Figure 1:
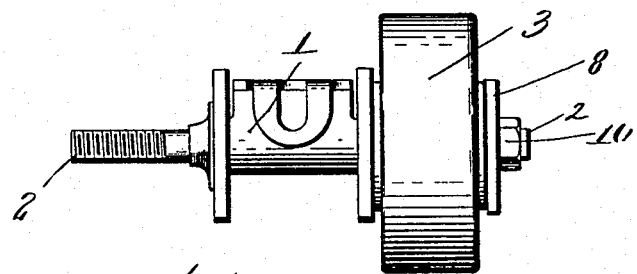

No. 823,939. PATENTED JUNE 19, 1906.
O. W. EVERETT.
ROLLER FOR SKATES.
APPLICATION FILED JUNE 5, 1905.

Witnesses:
C. F. Mason
M. O'Cane

Inventor:
O. W. Everett
By Attorney
John C. Dewey

UNITED STATES PATENT OFFICE.

OTIS W. EVERETT, OF WORCESTER, MASSACHUSETTS, ASSIGNOR TO THE SAMUEL WINSLOW SKATE CO., A CORPORATION OF MASSACHUSETTS.

ROLLER FOR SKATES.

No. 823,939.     Specification of Letters Patent.     Patented June 19, 1906.

Application filed June 5, 1905. Serial No. 263,712.

*To all whom it may concern:*

Be it known that I, OTIS W. EVERETT, a citizen of the United States, residing at Worcester, in the county of Worcester and State of Massachusetts, have invented certain new and useful Improvements in Rollers for Skates, of which the following is a specification.

My invention relates to a roller or wheel, and particularly to a metal roller or wheel for roller-skates.

The object of my invention is to make a metal roller or wheel, preferably of steel and having ball-bearings, of improved construction and in which the several parts of the roller are first pressed or formed into the desired shape and then put together and permanently secured together to make the completed roller without any rivets or screws.

My invention consists in certain novel features of construction of my improvements, as will be hereinafter fully described.

I have shown in the drawings a roller or wheel of my improved construction combined with an axle and a truck of a roller-skate of ordinary and well-known construction.

Figure 2:
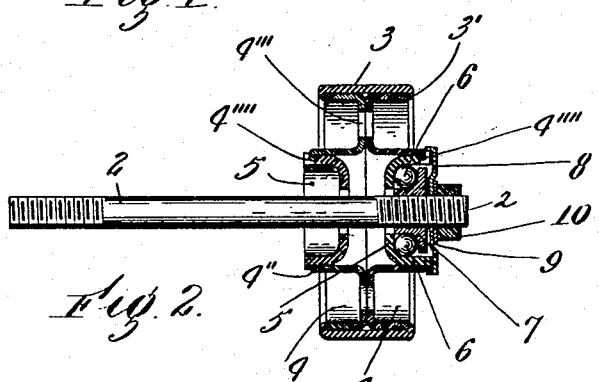
Figure 3:
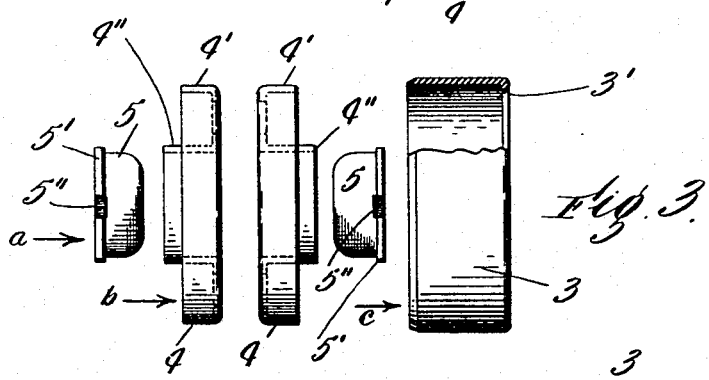
Figures 4, 5, 6:
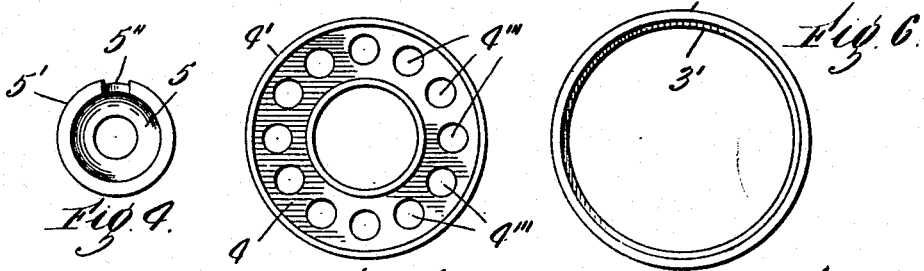

Referring to the drawings, Figure 1 shows a skate-truck, an axle, and a roller of my improved construction. Fig. 2 is a central vertical section through my improved roller and also shows the axle attached at one end to the roller. Fig. 3 shows the several parts of my roller detached. Fig. 4 is a front side view of a ball-cup shown in Fig. 3 looking in the direction of arrow $a$, same figure. Fig. 5 is a front view of the ball-cup holder shown in Fig. 3 looking in the direction of arrow $b$, same figure. Fig. 6 is a side view of the roller tire or rim shown in Fig. 3 looking in the direction of arrow $c$, same figure.

In the accompanying drawings, 1 is a metal roller-skate truck, which may be of any usual and well-known construction and which is secured to the skate (not shown) and has a bearing for the axle 2 in the usual way.

I will now describe my improved roller.

My improved roller, which is made of metal and preferably of steel, comprises the tire or rim 3 of suitable width and flat throughout its width and forming the flat tread or bearing surface of the roller. The rim 3 has one edge turned over or bent downwardly, forming an inwardly-extending annular lip or flange 3'. There are two ball-cup holders 4 which are pressed or formed into the shape shown in the drawings, with the annular peripheral lip or flange portion 4' extending at right angles to the main portion and of a width a little less than one-half the width of the rim 3 and adapted to fit tightly within the rim 3 and the central hub portion 4'' adapted to receive the ball-cup 5. The portion of the cup-holder 4 intermediate the rim portion 4' and the hub portion 4'' is preferably perforated or provided with openings 4''', as shown in Fig. 5. The ball-cup 5 has, preferably, an outwardly-extending lip or flange 5' on its outer edge, which is cut away at one point, 5'', as shown in Fig. 3.

In assembling the parts (shown in Fig. 3) of my improved roller one of the ball-cup holders 4 is placed within the rim 3 and forced therein until the outer edge bears against the lip or flange 3'. The other cup portion 4 is then placed within the rim 3 and forced against the first cup portion. The edge of the rim 3 opposite to the flanged edge 3' is then turned over or pressed downwardly and inwardly, as shown at 3'', Fig. 2, to hold the two cup portions 4 within the rim 3. Each ball-cup 5 is then inserted and forced within the hub portion 4'' of each cup-holder 4, and a portion of the hub portion 4'' is bent into the notch or recess 5'' in the annular lip or flange 5' on the ball-cup 5, as shown at 4'''', in Fig. 2. In this manner the several parts of my improved roller are rigidly and firmly secured together without the use of any rivets or screws. After the several parts of my improved roller have been put together the completed roller is placed upon the axle 2, and balls 6 are placed within the ball-cup 5, and the adjustable cone 7 is screwed onto the threaded end of the axle 2. A cap 8 is placed on the axle 2 and fitted over the outer end of the cup-holder 5, a washer 9 is fitted onto the axle, and a nut 10 screwed on to secure the parts together in the ordinary way.

The advantages of my improvements in roller or wheel will be readily appreciated by those skilled in the art.

I provide a metal roller or wheel having a flat tread or bearing-surface of very strong and durable construction and in which the several parts are permanently and rigidly secured together without any rivets or screws.

It will be understood that the several parts of my roller or wheel are made of such a size relatively to each other that in assembling the parts or putting them together they will fit very closely and tightly and will have to be forced into position under considerable pressure in a suitable device.

It will be understood that the details of construction of my improvements may be varied, if desired.

Having thus described my invention, what I claim as new, and desire to secure by Letters Patent, is—

1. A metal roller or wheel having a flat tread, and comprising a metal tire or rim having on each edge an inwardly-extending annular lip or flange, two ball-cup holders, each having an annular lip or flange extending at right angles to the main portion thereof and of a width a little less than one-half the width of the rim, and fitting tightly within the rim, and each having a central hub portion, and a ball-cup fitting within each central hub portion and secured therein.

2. A metal roller or wheel having a flat tread, and consisting of a metal tire or rim, two ball-cup holders, each having an annular lip or flange extending at right angles to the main portion and of a width a little less than one-half the width of the rim, and extending within the rim and secured therein by the turned-over edges of the rim, and each having a central hub portion, and two ball-cups, each extending within the central hub portion of a ball-cup holder, and secured therein.

3. A metal roller or wheel having a flat tread, and consisting of a metal tire or rim, two ball-cup holders, each having an annular lip or flange thereon extending at right angles to the main portion, and extending within said rim, and secured therein by the turned-over edges of the rim, and each ball-cup holder having a hub portion, and two ball-cups, each extending within a hub portion, and secured therein by a portion of the hub extending into a notch on the edge of the ball-cup.

OTIS W. EVERETT.

Witnesses:
J. C. Dewey,
M. Haas.